United States Patent
Towers et al.

[11] Patent Number: 6,142,584
[45] Date of Patent: Nov. 7, 2000

[54] BRAKE SYSTEM HAVING A PLURALITY OF OPERATIONAL SOURCES

[75] Inventors: Kenneth Scott Towers, Granger; Gregory Paul Goodzey, South Bend; Bryan F. Heinz, Goshen, all of Ind.; Timothy Jay Albert, Niles, Mich.

[73] Assignee: Robert Bosch Corporation, Broadview, Ill.

[21] Appl. No.: 09/259,814

[22] Filed: Feb. 26, 1999

[51] Int. Cl.$^7$ ....................................................... B60T 13/14
[52] U.S. Cl. ........................... 303/114.1; 60/421; 60/422; 60/58
[58] Field of Search .............................. 60/421, 422, 545, 60/547.1, 547.2, 555, 566, 574, 581, 582; 303/10, 15, 114.1, 114.2; 188/358

[56] References Cited

U.S. PATENT DOCUMENTS

| | | | |
|---|---|---|---|
| 4,986,613 | 1/1991 | Nishii et al. | 303/114.1 |
| 5,031,968 | 7/1991 | Takata | 303/15 |
| 5,142,865 | 9/1992 | Sakakihara et al. | 60/547.1 |
| 5,960,629 | 10/1999 | McClain et al. | 60/547.2 |
| 6,038,857 | 3/2000 | Towers et al. | 60/422 |

Primary Examiner—Chris Schwartz
Attorney, Agent, or Firm—Leo H McCormick, Jr.; Warren Comstock

[57] ABSTRACT

A brake system (10) having a control member (12) through which a remotely located master cylinder (18) is selectively supplied with either a first operational fluid developed by a first pump (14), a second operational fluid developed by a second pump arrangement (500,600) or a third operational fluid from a storage system (302) as a function of a brake force applied to an input push rod (16) and a sensed flow of operational fluid through a shuttle valve (64) to the master cylinder for effecting a desired brake application. A electronic control unit (200) receives an input signal corresponding to the brake force and a sensed flow to activate the second pump arrangement (500,600). Whenever the fluid pressure of the first operational fluid is insufficient, the second pump is activated and the second operational fluid supplants the operation of the master cylinder (18) by the first operational fluid to effect the desired brake application. Whenever both the first fluid pressure in the first operational fluid and the second fluid pressure in the second operational fluid are insufficient, an operator applies additional the input force to the input member (16) and moves an actuation piston (58) past a tilt valve (318) to allow a third fluid pressure in a third fluid retained in the storage system (302) to be communicated to the master cylinder (18) to effect a desired brake application.

12 Claims, 6 Drawing Sheets

BRAKE SYSTEM HAVING A PLURALITY OF OPERATIONAL SOURCES

This invention relates to a brake system having a control member to selectively supply a remotely located master cylinder with either a first operational fluid developed by a first pump, a second operational fluid developed by a second pump or a third operational fluid from a storage system as a function of a brake force applied to an input member and a sensed flow of operational fluid through a shuttle valve to the master cylinder for effecting a desired brake application.

BACKGROUND OF THE INVENTION

Hydraulic brake boosters have been designed to provide an assist in the actuation of a master cylinder where a brake force is developed to effect a brake application. In order to reduce the cost of a hydraulic brake booster, often the same hydraulic power source used to supply a steering gear is used to power a hydraulic brake booster. The controls for such hydraulic brake boosters are designed such that a minimum amount of hydraulic fluid is always available for operation of either the hydraulic brake booster or the steering gear. In certain brake boosters of the type disclosed in U.S. Pat. Nos. 3,967,536; 4,131,055; 4,179,980; 4,514,981; 4,724,674 and 5,442,916, the booster operates by restricting flow from one side of a power piston to the other side of the power piston to create a fluid pressure differential which causes the power piston to move and provide power assisted displacement of the pistons in a master cylinder. In this type of brake booster, the master cylinder and booster are joined together and as a result the overall length occupies considerable under hood space of a vehicle. Because of the efficiency of such brake boosters they have found application in many vehicles and in particular van and certain mid-sized trucks. However, in recent vehicle models the physical design of the under hood space is often restricted or reduced, and consequently locating a brake booster and other components is often a difficult task. To better utilize under hood space, it has been suggested in U.S. Pat. Nos. 5,329,769, 5,313,796 and U.S. patent application Ser. No. 09/015,166, (U.S. Pat. No. 5,966,629) that certain brake systems components could be located remotely from under the hood. The control valve disclosed in U.S. patent application Ser. No. 09/015,166 (U.S. Pat. No. 5,966,629) functions in an adequate manner, however it is desirable to provide for a more stable or smoother application of the spool valve in the development of pressurized fluid to initiate a brake application.

U.S. patent application Ser. No. 09/097,778 (98/7530) filed Jun. 15, 1998 and now U.S. Pat. No. 6,038,857 discloses a brake system having a booster with a control apparatus wherein the rate of application of a spool valve is regulated to assure a smooth and effective development of a braking signal from a supply fluid derived from a pump to operate a remotely located master cylinder. In the absence of supply fluid, movement of an input member within the booster pressurizes fluid to provide a braking signal for operating the service brake and provide an emergency back-up brake for a vehicle. This brake system is adequate for certain applications but may not provide for sufficient back-up braking to meet proposed industry standards for future vehicles.

SUMMARY OF THE INVENTION

A primary object of the present invention is to provide a brake system with a plurality of back-up sources for providing operational fluid for a remote master cylinder to effecting a brake application should a failure occur in a primary source of operational fluid.

According to this invention, a brake system has a control member which receives a supply fluid produced by first pump in a steering system. In response to a desired braking force applied to an input member, the control member develops a first pressure in the supply fluid to create a first operational fluid. A shuttle valve, which is positioned by the supply fluid in a first location, allows the first operational fluid to flow therethrough and be communicated to a remote master cylinder as the primary mode for effecting a brake application corresponding to the desired braking force in the service brakes. A sensor connected to the shuttle valve develops an operational signal indicating flow of the first operational fluid to remote master cylinder. This operational signal is supplied to an ECU (electronic control unit or computer) and evaluated with an input signal indicative of the braking force applied to the input member. If the ECU determines that the operational signal indicates a predetermined low flow or no flow of the first operational fluid through the shuttle valve, the ECU supplies a second pump with an activation signal for developing a second fluid pressure in a second operational fluid. This second operational fluid is thereafter communicated to operate the remote master cylinder by supplanting the actuation thereof through the first operational fluid to effect the desired brake application. When the first pump is operating, a storage system is designed to retain a volume of the supply fluid which is defined as a third operational fluid which has a third fluid pressure. In applying the braking force to the input member an input piston is moved within an actuation chamber to develop an actuation fluid pressure in fluid therein. With the shuttle valve in the first position, the actuation fluid pressure flows through a restrictive orifice to a reservoir to modulate the application rate of the development of the first fluid pressure in the first operational fluid. Should the fluid pressure in the supply fluid be less that a predetermined value or the first pump inactivated, a resilient means positions the shuttle valve in a second location where the actuation fluid pressure is communicated to the master cylinder as an emergency operational fluid. As long as the second pump is operating the second fluid pressure in the second operational fluid continues to operate the master cylinder. If an operator feels that desired braking is not being achieved and applies an additional or increases the braking force on the input member an input piston opens a tilt valve in the storage system. When the tilt valves opens, the third operational fluid flows to the remotely located master cylinder by way of the shuttle valve connection. The third operational fluid is combined with the emergency fluid to operate the master cylinder by supplanting the second operational fluid to effect a desired brake application.

An advantage of this brake system resides in the back-up structure for the development of secondary operational pressurized fluid when a primary source of operational pressurized fluid is ineffective to activate a remote master cylinder to meet a desired braking situation.

A further advantage of the brake system of this invention is provided the integrated functional relationship of a control member, a shuttle valve, flow sensor, a computer and force sensor to selectively supply a first operational fluid, a second operational fluid or a third operational fluid to a remote master cylinder to effect a brake application.

DETAILED DESCRIPTION

Figure 1:
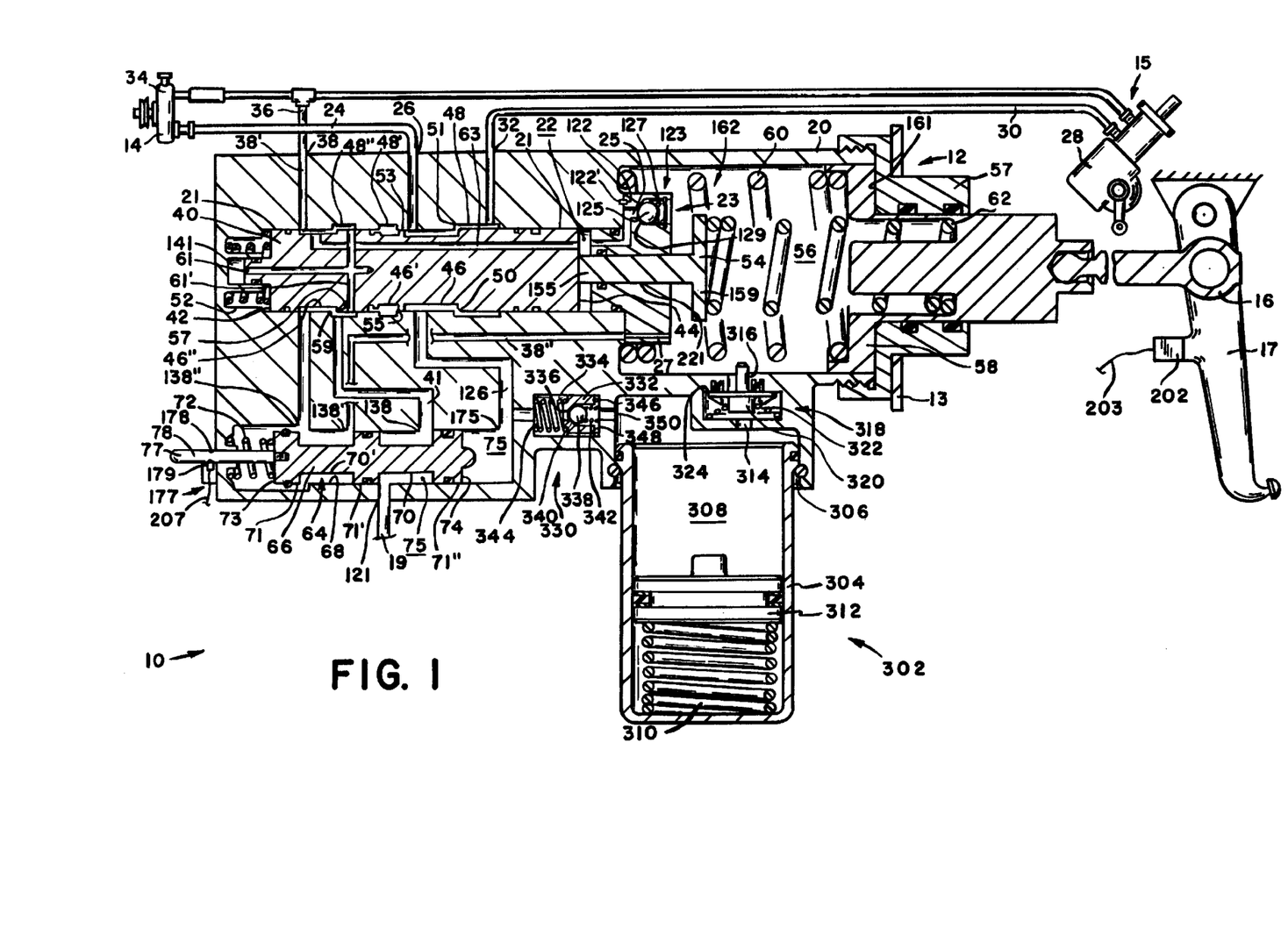
FIG. 1 is a schematic illustration of a control member and shuttle valve for a brake system through which operational fluid is supplied to a remote master cylinder in according to the principals of the present invention.
Figure 2:
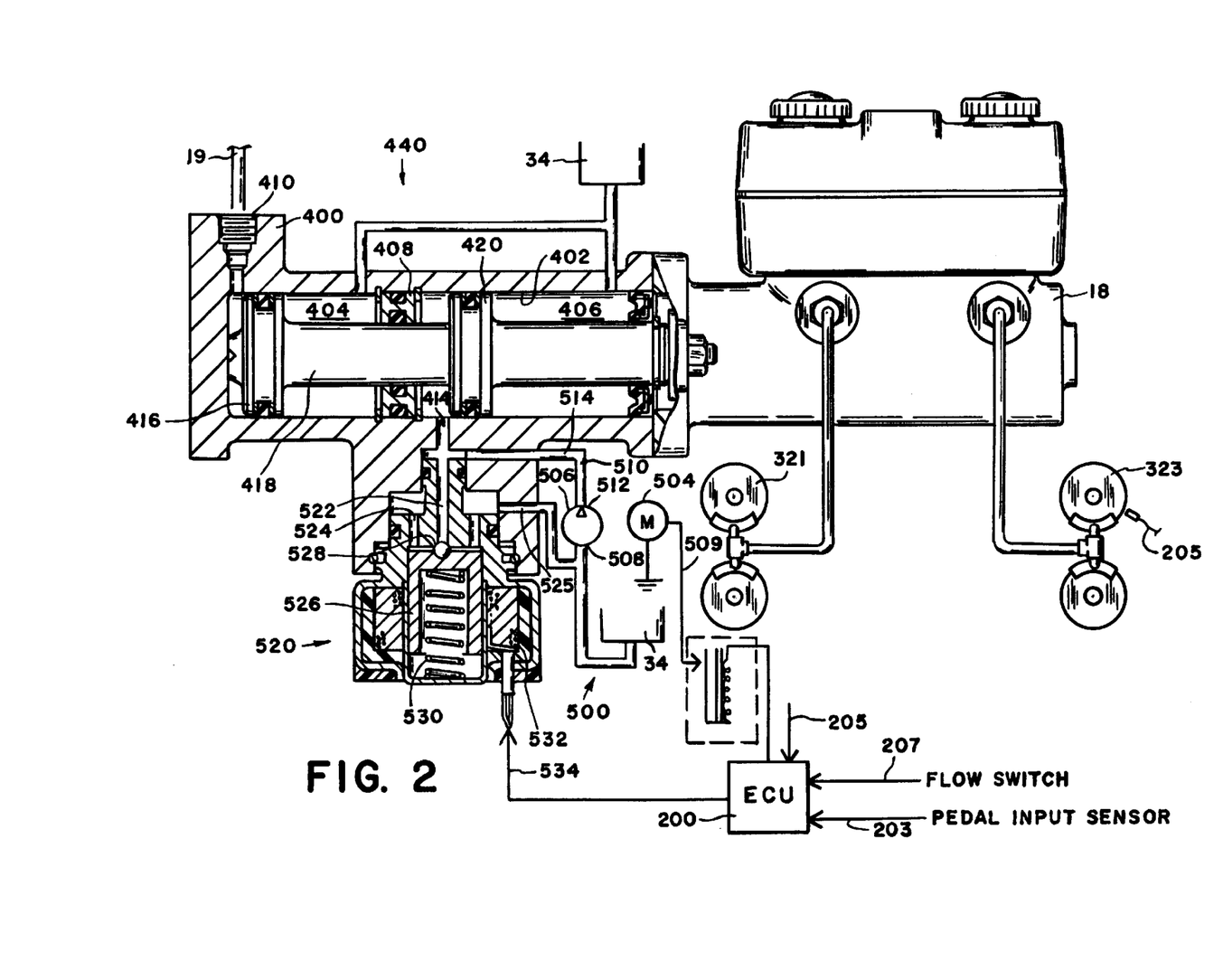
FIG. 2 is a schematic illustration of a remote master cylinder, an electronic control unit and a second pump for developing a secondary source for operational fluid for the brake system of FIG. 1.

The brake system 10 shown in FIGS. 1 and 2 has a control member 12 which is mounted on the fire wall 13 of a vehicle. The control member 12 receives supply fluid having a first fluid pressure from pump 14 in the steering system 15. The control member 12 is activated by an operator applying a braking force to pedal 17 attached to rod 16. The rod 16 moves a spool valve 40 to develop a first operational pressure in the supply fluid which is thereafter supplied as a first operational fluid to a remotely located master cylinder 18 for developing an actuation force to effect a corresponding brake application of wheel brakes 321,323 of a vehicle. The flow of the first operational fluid through shuttle valve or selector valve 64 is sensed by a flow switch 177 and communicated to an electronic control unit or computer 200 which receives a brake input signal from pedal sensor 202 connected to pedal 17. The ECU 200 compares and/or evaluates the flow signal and the brake input signal and should the flow signal indicate low or non-existent flow of the first operational fluid, an actuation signal is supplied to activate motor 504 for pump means 500 and pressurized fluid to develop a secondary source of pressurized fluid for operating the master cylinder 18 and supplant the first operational fluid to effect a desired brake application. In the event that the operator determines that the secondary source of pressurized fluid is insufficient for effecting the desired braking operation, an increase in the input force applied by pedal 17 to rod 16 activates a tilt valve 318 in a storage system 302. When tilt valve 318 is moved or activated, a third operational fluid having a third fluid pressure is supplied to operate the master cylinder 18 and effect the desired brake application. Thus, the brake system 10 can be placed in operation through a primary operational fluid from a first pump 14, a first secondary operational fluid from a second pump means 500 and a second secondary operational fluid from a stored system 302 to effect a brake application in response to an input force applied to a pedal 17.

In more particular detail, the control member 12 as shown in FIG. 1, has a housing 20 with a first bore 21 and a second bore 68 located therein. The first bore 21 is separated into a first chamber 22 and a second chamber 56 by divider means 23. The first chamber 22 is in communication with the first pump 14 by conduit 24 connected to inlet port 26, with a steering gear 28 or other hydraulically operated device in the steering system 15 by conduit 30 connected to gear port 32, with a reservoir 34 in pump 14 by a conduit 36 connected to relief port 38 and with outlet passage 41 associated with the low flow or shuttle valve 64. The shuttle valve 64 in turn is connected to master cylinder 18 by a conduit 19 connected to outlet port 121 of the second bore 68.

A spool 40 which is located in the first bore 21 to control the flow of the supply fluid from pump 14 through housing 20 has a cylindrical body with a first end 42 and a second end 44. The cylindrical body has a first groove 46, a second groove 46' and a third groove 46" which are aligned with corresponding grooves 48,48' and 48" in housing 20. A return spring 52 acts on end 42 and urges end 44 into engagement with a stop formed by linkage means 162 connected to rod 16 attached to pedal 17. A first land 50 associated with groove 46 and a first land 51 associated with groove 48; a second land 53 associated with groove 46' and a second land 55 associated with groove 48'; and a third land 57 associated with groove 48" and a third land 59 associated with groove 48" are designed to overlap each other in a radial direction. In a rest position, land 53 engages housing 20 such that fluid under pressure available from inlet port 26 is prevented from being communicated to the second groove 48' such that unrestricted fluid flow occurs between pump 14 and gear 28 and the storage system 302 by way of passage 126. At the same time, lands 57 and 59 are positioned such that free communication occurs between groove 46" and reservoir 34 by way of passage 38' connected to relief port 38. Spool 40 has an operational bore 61 with at least one cross bore 61' which is connected to the third groove 48" in housing 20 and to the second bore 68 by way of operational outlet passage 41. Spool 40 also has a compensation bore 63 which extends from the second end 44 to the third groove 46" such the first chamber 22 is always in communication with reservoir 34 by way of relief passage 38', relief port 38 and conduit 36.

Divider means 23 has a cylindrical body having first and second diameters. The cylindrical body has an axial opening 221 through its center and a first axial passage 25 and a second axial passage 27 that extends through the larger diameter. The axial opening 221 has sufficient length to form a bearing surface for stem 155 on plunger 54 of linkage means 162 and avoid binding or offset loading on movement of spool 40 in response to a desired braking input applied to rod 1 6 by pedal 17. The first passage 25 extends through the divider means 23 in such a manner as to connect actuation chamber 56 with chamber 22 and provide a flow path for fluid from reservoir 34. A check valve 123 located in the first axial passage 25 has a ball 125 which is urged by a spring 127 against a seat 129 formed in the larger diameter of the cylindrical body. Spring 127 may not be necessary for all applications but is included to assure that fluid communication is limited to one way communication such that fluid flow is limited to only be communicated from the reservoir 34 to chamber 56. The second axial passage 27 has a predetermined size which defines an orifice to restrict or limit communication of fluid out of chamber 56 to a relief passage 38" connected to the second bore 68. The cylindrical body of divider means 23 has a tab or pin 122 which engages a corresponding opening 122' in housing 20 to assure that the second passage 27 is aligned with relief passage 38".

Linkage means 162 in addition to plunger 54 includes an input piston 58, a second return spring 60 and an actuation spring 62. The second return spring 60 engages housing 20 and urges piston 58 toward a stop 161 formed by cap or end member 57 attached to housing 20 while actuation spring 62 is caged between head 159 of stem 155 and input piston 58.

Input piston 58 moves axially within actuation chamber 56 in response to an input force applied to pedal rod 16 to displace actuation fluid therein to the second bore 68 by way of the restricted or second passage 27 in divider means 23 and relief passage 38".

A pedal sensor 202 is connected to pedal 17 to provide the electronic control unit 200 with a braking signal which indicates the input force applied to effect a desired braking for the vehicle.

The storage system 302 has a housing 304 which is attached to housing 20 by a snap ring and seal arrangement 306 to define an accumulator or storage chamber 308. A gas charge or a spring 310 in chamber 309 urges a piston 312 toward an outlet port 314 connected by passage 316 to the second chamber 56. A tilt valve 318 located in passage 316 has a head 320 which is urged by a spring 322 toward a seat 324. When head 320 engages seat 324 storage chamber 308 is sealed from actuation chamber 56. Chamber 308 is connected through a check-relief valve 330 to passage 126 in housing 20. The check-relief valve 330 has a cylindrical disc 332 which is located in a bore 334 in housing 20. The cylindrical disc 332 has a central opening 336 with a ball 338 located therein which is urged toward a seat 340 by a first spring 342. A second spring 344 acts on the cylindrical disc 332 and urges a face seal 346 into engagement with an surface 348 surrounding passage 350 connected to chamber 308. The first spring 342 has a low force such that supply fluid present in passage 126 freely flows toward storage chamber 308 by moving ball 338 off seat 340. The second spring 344 has a high force such that the fluid pressure in chamber 308 must be above a predetermined value which approaches the burst strength of the snap ring and seal 306 before permitting face seal 346 to move away from surface 348 and allow a release of pressurized fluid to passage 126 before any damage occurs to the storage system 302.

The second bore 68 in housing 20 has a supply port 175 connected to passage 126 and receives the same supply fluid that bore 21 receives from pump 14, a control port 138 which is connected by outlet passage 41 to receive the first operational fluid presented to the third groove 48", an actuation port 138' which is connected to receive actuation fluid discharged from chamber 56 by way of passage 38", and a relief port 138" which is connected to reservoir 34 by way of relief passage 38'.

A selector piston 66 for the shuttle valve 64 is located in the second bore 68. Selector piston 66 has a cylindrical body with a first end 73 and a second end 74. The cylindrical body has a peripheral surface with first 70 and second 70' grooves defined by first 71,71'and 71" lands. The second bore 68 is stepped such that land 71 is normally located in a first diameter section while lands 71' and 71" are always located in and engage a smaller second diameter section associated with actuation port 138', control port 138 and supply 1 75. A spring 72 abuts the first end 73 of selector piston 66 and urges the second end 74 toward a chamber 75 connected to receive supply fluid from the first pump 14 through control port 175.

A indicator probe 77 has a stem 78 which is attached to end 73 of piston 66 and extends through housing 20. Sensor 177 has a contact member 179 which engages detent 178 on stem 78 when piston 66 is in the first position as indicted in FIG. 1. The location of indicia or color markings on stem 78 with respect to housing 20 provides a visual indication of the position of piston 66 within bore 68 while sensor 177 supplies a corresponding electronic signal indicating such position to ECU 200.

The remote master cylinder 18 as shown in FIG. 2 has a booster housing 400 with a bore 402 therein divided into a first chamber 404 and a second chamber 406 by a stationary ring 408. The first chamber 404 is connected to selector valve 64 by way of the attachment of conduit 19 to port 410 while the second chamber 406 is connected to a second pump means 500 by a passage or conduit 414. A first piston 416 which is located in the first chamber 404 has a stem 418 which extends through the stationary ring 408 and into second chamber 406. Stem 418 is designed to engage and provide a second piston 420 located in the second chamber 406 with an operational input force. The second piston 420 is correspondingly linked to provide operational pistons (not shown) in the pressurizing bore of master cylinder 18 with operational force to effect the desired braking.

The second pump means 500 as shown in FIG. 2 has an electric motor 504 which drives a rotary pump 506. Electric motor 504 is connected by lead 509 to the ECU 200 to selectively receive on lead 203 an actuation signal corresponding to braking force applied to pedal sensor 202. Pump 506 has an inlet port 508 connected to reservoir 34, or if desired to a separate secondary supply of fluid, by inlet conduit 510 and an outlet port 512 connected to the second chamber 406 in master cylinder 18 by supply conduit 514. A proportional solenoid valve 520 has an inlet port 522 connected to supply conduit 514 and an outlet port 524 connected to by outlet conduit 525 to inlet conduit 510. The proportional solenoid valve 520 has a plunger 526 which is urged toward a seat 528 by a spring 530 and a coil member 532 that surrounds the plunger 526. Coil member 532 is connected to the ECU 200 by a lead 534 and simultaneously receives an actuation signal on actuation of electric motor 504.

Figure 6:
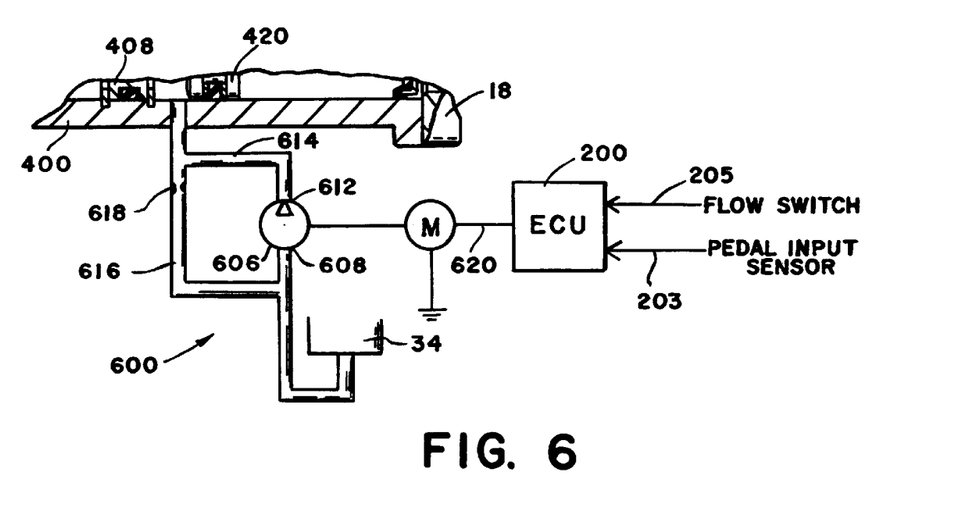
FIG. 6 is a schematic illustration an alternate pump means for developing the secondary source of operational fluid for the remote cylinder illustrated in FIG. 2.

A alternate pump means 600 for the brake system 10 is illustrated in FIG. 6. Pump means 600 has an electric motor 604 which drives a rotary pump 606. The rotary pump 606 has an inlet port 608 connected to reservoir 34 by a conduit 610 and an outlet port 612 connected by conduit 614 for delivering pressurized fluid to the second chamber 406 in master cylinder 18. A conduit 616 having a restricted passage 618 therein connects supply conduit 614 with inlet conduit 610 to provide for a return flow path between chamber 406 and reservoir 34. Electric motor 604 is connected by lead 620 to receive an actuation signal from ECU 200. The actuation signal has a pulse width which has been modulated as a function of the input force applied by an operator to pedal 17 as detected or measured by pedal sensor 202.

The shuttle valve 64 and flow sensor 177 of in FIG. 1 are shown as being located in the second bore 68 of housing 20. The shuttle valve 64 functions to direct operational pressurized fluid present in outlet passage 41 and derived from supply fluid provided by pump 14 to brake booster 18. However, the operational function of shuttle valve 64 is independent from the booster apparatus 12 and could be remotely located in a separate housing.

Mode of Operation of the Invention

When an engine for a vehicle is running, the first pump 14 is designed to provide pressurized supply fluid through control member 12 to the steering system 15. In this operating condition as shown in FIG. 1, return spring 52 moves spool 40 to a rest position and pressurized fluid is freely communicated from the first pump 14 to steering gear 28 or hydraulically operated device by way of inlet port 26, the first bore 21, first grooves 46 and 48, gear port 32 and conduit 30. Land 53 is designed to engage bore 21 such that pressurized supply fluid is prevented from being communicated to groove 48' while at the same time pressurized supply fluid is freely communicated to supply chamber 75 in the second bore 68 by way of passage 126 and to storage chamber 308 in the storage system 302. Pressurized fluid in storage chamber 75 acts on end 74 of selector piston 66 to overcome spring 72 and position land 71' in a first position which permits unrestricted communication between groove 48' and boost chamber 404 in master cylinder 18. In the first position, land 71 is located in the larger diameter of the second bore 68 so that relief passage 38" is freely or unrestrictedly connected to reservoir 34 by way of actuation port 138', groove 70', relief port 138" relief passage 38', relief port 38 and conduit 36. The supply fluid in conduit 126 is freely communicated to storage chamber 308 in storage system 302 by flowing around ball 338 in check-relief valve 330 as spring 342 is designed to only provide as low force to seat the ball 338 on seat 340. The fluid pressure of the supply fluid acts on and moves piston 312 to charge the accumulator 304 as spring 310 or the gas charge is compressed. The supply fluid is retained in chamber 308 as tilt valve 318 is positioned by spring 322 to hold head 320 against seat 324 to seal passage 316 into chamber 56. Chamber 308 continues to be charged with supply fluid until the fluid pressure therein is substantially equal to the fluid pressure in the supply fluid as presented to inlet port 26. When chamber 308 is fully charged, spring 342 seats ball 338 on seat 340 to retain a fixed volume of supply fluid at a fluid pressure in chamber 308. Any increase in the fluid pressure of the supply fluid is also communicated to storage chamber 308 in the same manner as the charging continually occurs as long as pump 14 is operating to supply the steering system with operational pressurized fluid.

Figure 3:
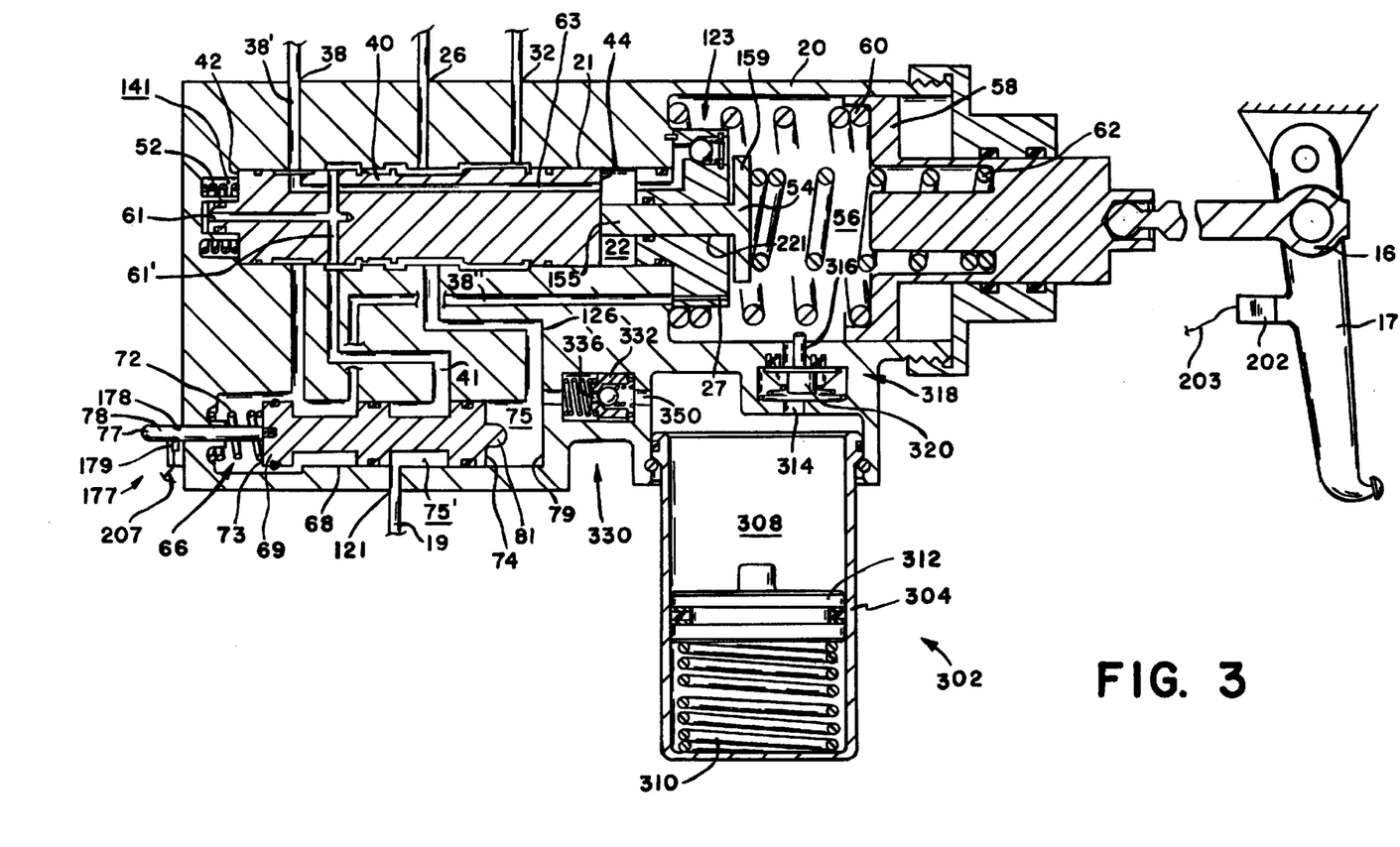
FIG. 3 is a sectional view of the control member of FIG. 1 wherein a first operational fluid is directed through the shuttle valve to provide the remote master cylinder of FIG. 2 with a first operational fluid.

Should an operator desire to make a brake application in a vehicle equipped with the brake system illustrated in FIGS. 1 and 2, an input force is applied to pedal 17 is transmitted to rod 16 which moves piston 58 into chamber 56 as illustrated in FIG. 3. Movement of piston 58 is communicated through actuation spring 62 to plunger 54 which after overcoming return spring 52 moves spool 40 in bore 21. As spool 40 moves in bore, land 51 moves toward land 53 causing a restriction in the flow of pressurized fluid from groove 46 while land 53 moves past land 55 in housing 20 to initially divert pressurized fluid into groove 48' which is later communicated along a flow path to groove 48" after land 57 laps land 59 in housing 20. The pressurized actuation fluid in groove 48" is simultaneously communicated to reaction chamber 141 and flow through chamber 75' formed in the second bore 68 in shuttle valve 64 for distribution of the first operational fluid to conduit 19 and chamber 404 in master cylinder 18. The first operational fluid presented to master cylinder 18, acts on piston 416 to create a force which is communicated through stem 418 to piston 420. This first operational force applied to piston 420 moves pistons in pressurizing chambers in the master cylinder 18 to pressurize fluid which is supplied to wheel brakes 321 and 323 to produce the desired braking of a vehicle. The operational pressurized fluid which is supplied to reaction chamber 141 acts on end 42 of spool 40 balances the input force applied to end 44 by stem 155 on plunger 54. In this mode of operation, contact 179 of flow sensor 177 is located in detent 178 on stem 78 to supply or provide ECU 200 with a signal which indicates that piston 66 is in a first position where the first operational fluid is capable of flowing through chamber 75'. The pedal sensor 202 associated with pedal 16 supplies the ECU 200 with a braking signal which is indicative of the braking force applied to pedal 17 to effect a desired brake application. As long as the pressure in the supply fluid is sufficient to hold piston 66 of shuttle valve 64 in the first position within bore 68, the flow through signal from sensor 177 is supplied to the ECU 200 and the second pump means 500 remain inactive.

Movement of piston 58 in actuation chamber 56 causes a pressure build up in the actuation fluid retained therein. Since passage 25 is blocked by one way check valve 123, actuation fluid is dispersed from actuation chamber 56 in a controlled manner through restricted passage 27 into relief passage 38" for distribution to reservoir 34 by way of a flow path through the second bore 68 and relief passage 38'. The controlled flow of actuation fluid from chamber 56 provides for a smooth rate of movement by spool valve 40 as the input force applied to plunger 54 is modified by both the force of actuation spring 62 and resistance of head 159 as it moves through the actuation fluid in chamber 56 For some application, resistance to movement of head 159 may be increased by changing its diameter or axial holes drilled there through to reduce the resistance to establish a desired rate of application of the wheel brakes 321,323 corresponding to an input force. When a desired braking application has been completed, the input force applied to pedal 17 is removed and return springs 52 and 60 move spool valve 40 and piston 58 to their rest positions shown in FIG. 1. As piston 58 moves in chamber 56, a lower pressure develops in the fluid therein causing ball 125 to move away from seat 129 and allow fluid from reservoir 34 to replenish or maintain the fluid in actuation chamber 56 at a desired volume.

Figure 4:
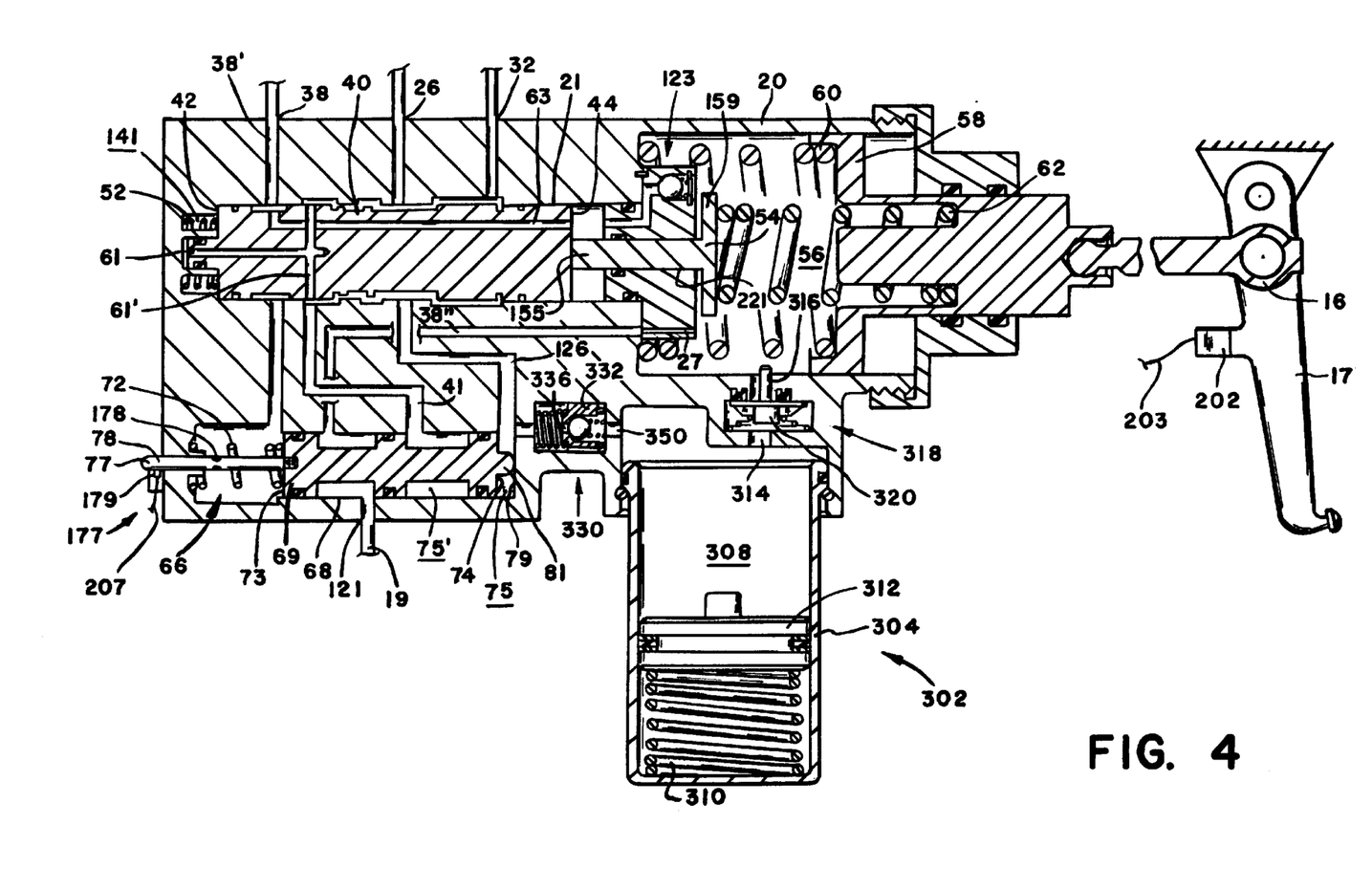
FIG. 4 is a sectional view of the control member of FIG. 1 wherein the secondary source for operational fluid developed by the second pump shown in FIG. 2 is supplied to operate the remote master cylinder.

In the event that the engine in the vehicle is not operating, the first pump 14 will not produce supply fluid for operating the power steering gear 28 as it is driven by power the engine of the vehicle. In order to maintain control of a vehicle, it is desirable to have and retain full braking capability for a vehicle even if the first pump 14 is inoperable. The brake system 10 illustrated in FIGS. 1 and 2 provides for a secondary source of pressurized fluid to achieve braking should the first pump become inoperative. To activate the secondary source of pressurized fluid, an operator applies an input force to pedal 17 to initiate braking of the vehicle. The mode of operation for the control member 12 in this situation is illustrated in FIG. 4 wherein spring 72 has shifted selector piston 66 of shuttle valve 64 to the second position. In the second position, land 71 on piston 66 moves from the large diameter and engages the small diameter of bore 68 to block communication from actuator port 138 through groove 70 to outlet port 121 and open communication from relief port 138' through groove 71' to conduit 19 by way of port 121. Movement of piston 66 toward supply chamber 75, causes contact 179 to moves out of or disconnect from detent 178 on stem 78 of flow sensor 177 to provide the ECU 200 with an operational signal. This operational signal is designed to indicate that selector piston 66 is in a second position such that the no flow of the first operational fluid from passage 41 is occurring to outlet port 121.

When an operator desires to effect a brake application with the first pump 14 inoperative, an input force is applied to pedal rod 17 which is transmitted through rod 16 to move piston 58 in actuation chamber 56 toward divider means 23. Because of the first passage 25 is blocked by one way check valve 123 movement or displacement of piston 58 into chamber 56 causes the actuation fluid in chamber 56 to be pressurized. This pressurized fluid is communicated through passage 27 to actuation port 138' in shuttle valve 64. Since relief port 138" blocked by the engagement of land 71 with the smaller diameter section of bore 68 in housing 20, the actuation fluid is communicated to chamber 404 in brake booster 18 by way of groove 70', outlet port 121 and conduit 19. Even in this situation, the input force applied to pedal 17 by an operator is communicated to the ECU 200 from pedal sensor 202 as a desired braking signal. The ECU 200 compares the no-flow signal from the flow sensor 177, a wheel speed signal provided on lead 205 and the desired braking signal from the pedal sensor 202 to determine if an operator desired braking is being achieved by a brake application. If the desired braking is not being achieved, the ECU supplies an actuation signal to both the proportional solenoid valve 520 and electric motor 504. Actuation of electric motor 504 provides for a rotary input to the second pump 506 to pressurize fluid available in conduit 510. The pressurized fluid developed by the second pump 506 is supplied to chamber 406 which acts on piston 420 to provide a force which moves pistons in the master cylinder 18 to pressurize fluid and effect a desired brake application. The actuation signal supplied by the ECU to coil 532 of the proportional solenoid 520 on lead 534 is pulse width modulated as a function of the input signal supplied from pedal sensor 202. The pulse width modulation actuation signal produces a force field in coil 532 that modulates the position of plunger 526 with respect to seat 528. Modulation of plunger allows a portion of the second fluid that flows from pump 506 to be diverted through inlet port 522 and out outlet port 524 and returned to conduit 510 such that the desired braking corresponding to the input force is produced to effect a brake application. When the operator terminates the application of the input force on the pedal rod 16, the braking signal representing the desired braking force to the ECU 200 terminates. On termination of the braking signal from pedal sensor 202, the actuation signal from the ECU 200 to electronic motor 504 is immediately terminated, however, the actuation signal to the proportional solenoid valve 520 remains for a set period of time to permit flow of fluid from chamber 406 to reservoir 34 by way of inlet port 522, outlet port 524 and conduit 510. As long as the vehicle has electric power, this secondary source to pressurize fluid is available to provide for an effective braking application.

Figure 5:
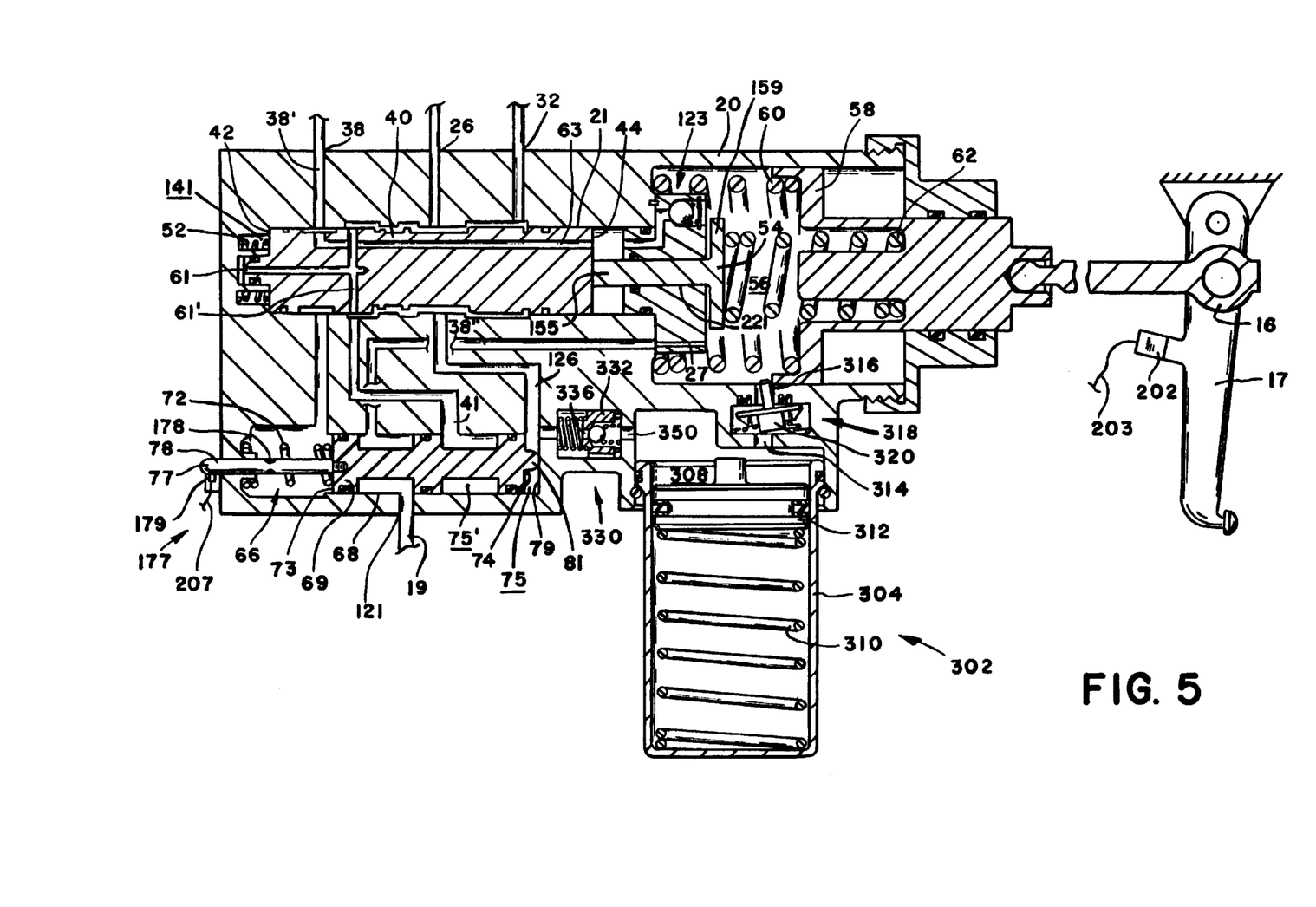
FIG. 5 is a sectional view of the control member of FIG. 1 wherein a third source of operational fluid retained in a storage system is supplied to operate the remote master cylinder shown in FIG. 2.

In the event that pump 14 is not operating as when the engine is not running and electric power is also unavailable, it is still possible to provide braking for a vehicle equip with the brake system 10 shown in FIGS. 1 and 2. An input force is applied to pedal rod 36 which moves piston 58 in chamber 56 toward divider means 23. As first passage 25 is blocked by one way check valve 123, movement of piston 58 in actuation chamber 56 causes the actuation fluid to be pressurized. This pressurized fluid as communicated through passage 27 to actuation port 138' in shuttle valve 64. Since spring 72 will have moved piston 66 to the second position such that relief port 138" is blocked by the engagement of land 71 with the smaller diameter of bore 68 in housing 20, this back-up braking or emergency pressurized fluid is communicated to chamber 404 in brake booster 18 by way of groove 70', outlet port 121 and conduit 19. The fluid pressure in this back-up braking or emergency fluid as presented to chamber 404 is usually not sufficient to meet a braking application as desired by the operator and as a result the operator may apply additional force on pedal 17 which is transmitted to rod 16. This additional input force applied to pedal 17 moves piston 58 further into actuation chamber 56 to a position where piston 58 engages stem 321 on tilt valve 318 which moves head 320 away from seat 324 and opens passage 316 as illustrated in FIG. 5. With passage 316 opened, the third operational fluid flows from chamber 308 into chamber 56 and thereafter is communicated to chamber 404 where it is combined with the back-up or emergency fluid already in chamber 404 of the booster section 440 of master cylinder 18 to provide the force to pressurize fluid in the pressurization section of the master cylinder 18 and effect a brake application. The resulting brake application should be sufficient to provide for emergency braking of the vehicle. The pressurized fluid will be retained in chamber 404 of the master cylinder 18 until pressurized fluid is again communicated to supply chamber 75 from the first pump 14 as spring 72 holds end 81 on piston 66 of shuttle valve 64 against stop 79 formed by housing 20 at the bottom of bore 68 to block communication to reservoir 34 through passage 38'.

Should it be necessary to move a vehicle when this emergency or back-up braking operation is effected, visual indicator 77 is pulled to compress spring 72 and dump the emergency pressurized fluid supplied to master cylinder 18 to effect the brake application by opening a flow path to reservoir 34 by way of conduit 19, passage 41, groove 48", groove 46" and relief passage 38', relief port 38 and conduit 36. The vehicle can be moved but if braking is required in this emergency mode after each application the pressurized fluid must be manually dumped by way of the shuttle valve 64. Once a destination is reached, pressurized fluid again developed by applying a force to pedal rod 16 as described above to produce an emergency braking force to hold a vehicle in a stationary location. However in this situation, the third operational fluid in storage system 302 is proportionally reduced each time it is activated and thereafter manually released to reservoir 34.

When supply fluid is again developed by pump 14, pressurized fluid will be communicated to conduit 126 and supplied to storage system 302 by freely flowing through check-relief valve 330 to chamber 308 and replenish the stored fluid to a desired pressure level. At the same time, pressurized fluid flows to supply chamber 75 and after overcoming spring 72 moves selector piston 66 in shuttle valve 64 to the first position. In the first position, land 71 moves into the large diameter of bore 68 to open groove 70 to relief passage 38' and relief port 38 connected to reservoir 34 while opening outlet passage 41 to groove 70' to provides a flow path for the first operational fluid developed by the flow of supply fluid to groove 48". With the shuttle valve 64 in this first position, flow sensor 177 provides a signal to the electronic control unit 200 which would permit the first operational fluid derived from the first pump 14 to be communicated to master cylinder 18 to effect a brake application.

We claim:

1. A brake system comprising:
   a control member connected to a first pump means for developing a first pressure in a first operational fluid in response to a brake force applied to said input member to effect a desired brake application;
   a shuttle valve connected to said control member;
   sensor means connected to said shuttle valve for developing a flow through signal indicating communication of said first operational fluid to a remotely located master cylinder for effecting a desired brake application;
   second pump means for developing a second pressure in a second operational fluid, said second pump means being connected to said master cylinder;
   a storage system for retaining a third operational fluid having a third pressure, said storage system being connected to said shuttle valve; and
   computer means being responsive to an absence of said flow through signal and a brake signal corresponding to said brake force applied to said input member for developing a pump actuation signal for operating said second pump means, said shuttle valve responding to an absence of said first operational fluid by shifting to a second position whereby said operating second pump means supplies said master cylinder with said second operational fluid to supplant the actuation of said master cylinder by said first operational fluid and effect said desired brake application, said input member in the absence of said first and second operational fluids opening said storage system to allow said third operational fluid to flow to the shuttle valve and be communicated to operate said remotely located master cylinder.

2. A brake system comprising:

a control member for developing a first pressure in a first operational fluid derived in a supply fluid received from a first pump means in response to a desired braking force applied to an input member;

a shuttle valve connected to said control member and responsive to said supply fluid;

sensor means for developing a flow through signal indicating a first position for said shuttle valve whereby said first operational fluid may be communicated to a remotely located master cylinder for effecting a brake application corresponding to said desired braking force;

second pump means for developing a second pressure in a second operational fluid, said second pump means being connected to said master cylinder;

computer means responsive to an input signal indicative of said braking force and in response to a predetermined flow through signal from said sensor means for supplying said second pump means with a pump actuation signal corresponding to said braking force for developing said second operational fluid which supplants the actuation of said master cylinder by said first operational fluid to effect said desired brake application; and a storage system for retaining a third operational fluid having a third pressure; said shuttle valve responding to a predetermined pressure in said supply fluid by shifting to a second position, said braking force moving said input member to activating a valve and allow said third operational fluid to flow from said storage system to said remotely located master cylinder with said shuttle valve in said second position, said third operational fluid thereafter operating said master cylinder by supplanting said first and second operational fluids to effect said desired brake application.

3. The brake system as recited in claim 2 wherein said predetermined flow signal is compared within said computer means with a wheel speed sensor and said input force to establish said pump actuation signal to effect said desired brake application.

4. The brake system as recited in claim 3 wherein said computer means in developing said pump actuation signal supplies a control valve with an actuation signal having a modulated pulse width which is proportional to said desired braking force applied to said input member.

5. The brake system as recited in claim 4 wherein said storage system includes an accumulator connected to said first pump means for receiving said supply fluid, said supply fluid having a substantially fixed pressure to define said third fluid pressure.

6. The brake system as recited in claim 5 wherein actuation of said valve directs said third fluid from said accumulator to said control member for distribution to said shuttle valve and thereafter to said remote master cylinder.

7. The brake system as recited in claim 6 wherein said master cylinder includes a boost section having a first chamber for receiving said first and third operational fluid and a second chamber for receiving said second operational fluid, said first chamber being separated from said first chamber by a wall which prevents mingling of said first, second and third operational fluids while at the same time providing for the separate and independent operation of pressurizing pistons within the master cylinder.

8. A brake system having a control member for developing a first pressure in a first operational fluid derived from a supply fluid received from a first pump means in response to a desired braking force applied to an input member and a shuttle valve positioned by said supply fluid at a first location whereby said first operational fluid is communicated to a remote master cylinder for effecting a brake application corresponding to said desired braking force, said shuttle valve being positioned by a resilient means at a second location in response to a predetermined pressure in said supply fluid such that back-up operational fluid is communicated to said remote master cylinder to effect a brake application, said brake system being characterized by sensor means for developing an operational signal indicating flow of said first operational fluid through said shuttle valve to said remote master cylinder; computer means responsive to an input signal indicative of said desired braking force and responsive to a predetermined operational signal from said sensor means for activating a second pump means to develop a second fluid pressure in a second operational fluid, said second operational fluid being communicated to said remote master cylinder to supplant the actuation thereof by said first operational fluid and effect said desired brake application; and a storage system for retaining a third operational fluid having a third fluid pressure, said braking force moving said input member to activate a valve and thereafter allow said third operational fluid to flow from said storage system to said remotely located master cylinder with said shuttle valve in said second position, said third operational fluid being combined with said back-up operational fluid to operate said master cylinder by supplanting said second operational fluid and effect said desired brake application.

9. The brake system as recited in claim 8 wherein said storage system is characterized by an accumulator connected to receive said a supply fluid from said first pump means.

10. The brake system as recited in claim 9 wherein said computer means is characterized by supplying said second pump means with an activation signal which is proportional to said braking force.

11. The brake system as recited in claim 10 wherein said master cylinder is characterized by a housing having a bore therein for retaining first and second operational pistons, said first operational piston being connected to said shuttle valve and said second operational piston being connected to said second pump means such that the larger of said first, second and third operational fluids acts on said first and second piston to operate pressurizing piston within the master cylinder and effect a brake application.

12. The brake system as recited in claim 11 wherein said shuttle valve is characterized by a cylindrical member which is retained in said second position by said resilient means until said predetermined pressure in said supply pressure is sufficient to overcome said resilient means such that said back-up fluid and said third operational fluid provide a sustained braking force at said remote master cylinder.

* * * * *